United States Patent [19]

Kono

[11] Patent Number: 4,853,844
[45] Date of Patent: Aug. 1, 1989

[54] DATA PROCESSING SYSTEM ADAPTABLE TO USING EQUIVALENT INTEGRATED CIRCUITS

[75] Inventor: Hiromi Kono, Higashimatsuyama, Japan

[73] Assignee: Diesel Kiki Co., Ltd., Tokyo, Japan

[21] Appl. No.: 885,883

[22] Filed: Jul. 15, 1986

[30] Foreign Application Priority Data

Jul. 18, 1985 [JP] Japan ................................ 60-157048

[51] Int. Cl.$^4$ ............................................... G06F 1/00
[52] U.S. Cl. .................................. 364/200; 364/221.1; 364/221.7
[58] Field of Search ... 364/200 MS File, 900 MS File

[56] References Cited

U.S. PATENT DOCUMENTS

| | | | |
|---|---|---|---|
| 4,050,098 | 9/1977 | Seipp | 364/900 |
| 4,191,996 | 3/1980 | Chesley | 364/200 |
| 4,268,901 | 5/1981 | Subrizi et al. | 364/200 |
| 4,334,307 | 6/1982 | Bourgeous et al. | 364/200 |
| 4,562,532 | 12/1985 | Nishizawa et al. | 364/200 |
| 4,589,063 | 5/1986 | Shah et al. | 364/200 |
| 4,622,633 | 11/1986 | Ceccon et al. | 364/200 |

Primary Examiner—Eddie P. Chan
Assistant Examiner—Rebecca L. Rudolph
Attorney, Agent, or Firm—Pollock, Vande Sande & Priddy

[57] ABSTRACT

A data processing system which has a plurality of integrated circuit devices and which carries out a predetermined data processing operation in accordance with a stored program, has a discriminator for discriminating which of integrated circuit devices from amongst a plurality of predetermined types is presently being used for at least one functional device in the system, and an executing unit responsive to the output of the discriminator for executing a predetermined data processing in accordance with a program which is arranged so as to perform the predetermined data processing operation no matter which type of integrated circuit device is selected from a predetermined range of selectable functional devices, so that data processing in accordance with the selected type of integrated circuit device at that time can be performed without changing the program, thereby allowing a wide range of replacement devices.

4 Claims, 2 Drawing Sheets

DATA PROCESSING SYSTEM ADAPTABLE TO USING EQUIVALENT INTEGRATED CIRCUITS

BACKGROUND OF THE INVENTION

The present invention relates to a data processing system employing a microprocessor and more particularly to a data processing system capable of exchanging into other equivalent elements the individual integrated circuit elements within the data processing system which includes a microprocessor, without changing a control program.

In recent years, many control apparatuses using a data processing system which includes a microprocessor have been used in a variety of fields. In these types of control apparatuses, besides a microprocessor, a read-only memory (ROM), a random access memory (RAM), analog/digital (A/D) converter, digital/analog (D/A) converter, parallel-interface adapter (PIA) and the like are used in the form of integrated circuit devices which are functional devices with each one fulfilling its required function.

In a control system employing a microprocessor, there are provided numerous devices of a wide variety for each device used in the control system. However, when a device is to be replaced, the replacement device must have identical specifications as well as identical pin assignments. If a device is replaced with another that is not completely identical thereto, it may become necessary to change the control program, which is economically onerous and inconvenient.

SUMMARY OF THE INVENTION

It is an object of the present invention to provide an improved data processing system, using microprocessors, which is constructed in such a way that it ensures some latitude with regard to the replacement of functional devices in the data processing system employing microprocessors.

It is another object of the present invention to provide a data processing system using microprocessors in which an integrated circuit device which is not completely identical to the rated one but is identical in function thereto can be used without replacement of programs.

According to the present invention, in a data processing system which has a plurality of integrated circuit devices including at least one microprocessor and which carries out a predetermined data processing operation in accordance with a stored program, the data processing system comprises a discriminating means for discriminating which type of integrated circuit device from amongst a plurality of predetermined types is presently being used in the data processing system for at least one functional device, means responsive to the result of the discrimination of the discriminating means for outputting an indicating signal for indicating the type of an integrated circuit device which is presently being used for the functional devices, and an executing means responsive to the indicating signal for executing a predetermined data processing in accordance with a program which is executed so as to be adapted to the type of the integrated circuit device being used as the desired functional device at that time.

When the operation of the data processing system is started, for example, by turning on a power switch, the discriminating device discriminates which types of integrated circuit devices are being used for the functional devices in the data processing device. The number of functional devices to be discriminated according to types may be one or more than one. Each of the functional devices to be discriminated as to type should be selected from amongst a plurality of predetermined types of integrated circuit devices. The discriminating means is provided beforehand with information for carrying out the discrimination among different types of integrated circuit devices for each functional device to be discriminated as to type, and the types of integrated circuit devices being presently used can be discriminated for individual functional devices on the basis of the information. When each type of the integrated circuit devices that is being used is discriminated, an indicating signal indicating the discrimination result is output.

A program for performing predetermined data processing is stored in a memory means, for example, a read-only memory (ROM), the program being executed in the microprocessor. The program is arranged so as to perform the predetermined data processing operation no matter which type of integrated circuit device is selected from a predetermined selected range of functional devices, so that the data processing in accordance with the selected type of the integrated circuit device at that time can be performed with reference to the indicating signal.

With this constitution, it becomes possible to replace an integrated circuit device by another device which is different in type therefrom but is identical in its basic constitution. Consequently, in carrying out the replacement, such as for maintenance or the like, the range of replacement devices becomes extremely wide, which is convenient.

The invention will be better understood and other objects and advantages thereof will be more apparent from the following detailed description of preferred embodiments with reference to the accompanying drawings.

DESCRIPTION OF THE PREFERRED EMBODIMENTS

Figure 1:
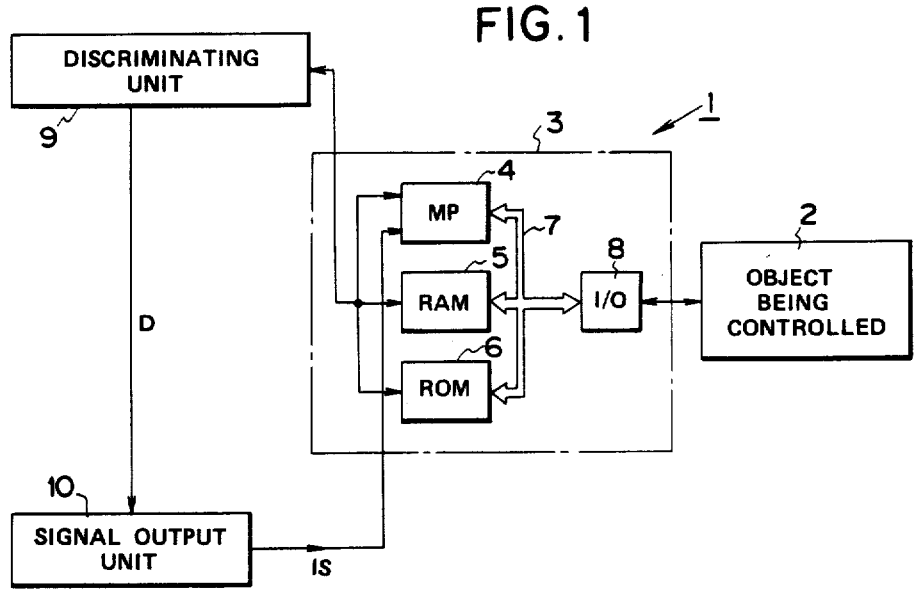
FIG. 1 is a block diagram showing a data processing system according to the present invention.

FIG. 1 is a block diagram showing a data processing system according to the present invention. A data processing system 1 is a system for controlling an object 2 in response to an input signal IS and comprises a control unit 3. The control unit 3 has a microprocessor (MP) 4, a random access memory (RAM) 5 and a read-only memory (ROM) 6, which are connected to each other by a bus 7 connected to an input-output unit (I/O) 8. A control program is stored in the ROM 6 for controlling the object 2 in accordance with the input signal IS applied to the input-output unit 8, and a control system is formed in accordance to a stored program whereby a predetermined control operation for controlling the object 2 is carried out in accordance with the program stored in the ROM 6. The result of the control calculation calculated in the microprocessor 4 is applied to the object 2 being controlled through the input-output unit 8.

Each of the blocks in the control unit 3 is constituted from one or more integrated circuit devices each of which is capable of performing a predetermined function. In order to freely select and use a plurality of predetermined types of elements as integrated circuit devices, the control program stored within the ROM 6 is capable of executing the required control operation for whichever one of the integrated circuit devices, within the predetermined selections is selected and set in the control unit 3, as long as information relating to the type of integrated circuit device to be selected is given to the control unit 3.

In this embodiment, each of the plurality of selectable devices for each particular functional device has identical pin assignments to avoid having to change the wiring thereof.

A discriminating unit 9 is provided in order to discriminate which type of integrated circuit device is being used. In view of the fact that a read-write area in the register portion of each integrated circuit device is assigned a different address, the discriminating unit 9 is adapted to perform, at least once, a discriminating operation in which predetermined data is written to a prescribed address in its register portion and then to read out the data in the prescribed address to discriminate whether the data that has been written in coincides with the data that has been read out. Information relating to the address of the read-write area of the register portion of each individual integrated circuit device which may be replaced by another type of integrated circuit is stored in advance in the discriminating unit 9. The discriminating unit 9 discriminates which type of integrated circuit device is actually being used. To find out whether it is possible to write data to and read out data from the prescribed address, the discriminating unit 9 performs the above-described write and read operation so as to discriminate the type of integrated circuit device being used.

Discrimination data D representing the results of the discrimination is input to a signal output unit 10 whereupon an indicating signal IS indicating the type of integrated circuit element to be discriminated is output and fed to the microprocessor 4 and to the input-output unit 8 through the bus 7 to control object 2.

The indicating signal IS is processed in the microprocessor 4 prior to the required control to be carried out by the microprocessor 4; and the program stored within the ROM 6 is executed on the basis of the result of the processing of the indicating signal IS. It is possible to execute the control program on the basis of this result by, for example, assigning an address so as to match the type of integrated circuit device being used.

According to this constitution, when the integrated circuit device to be used in the control unit 3 is selected from within a predetermined range, the type of integrated circuit element selected can be discriminated by the discriminating unit 9 and the program is executed by the microprocessor 4 so as to match the type of selected integrated circuit device.

Consequently, since the range of the usable integrated circuit devices becomes wider, the conditions required for replacing the integrated circuit device become less restrictive and the replacement of the ROM becomes unnecessary even if an integrated circuit device is replaced by another of a different type, which is extremely convenient.

The discriminating unit 9 and the signal output unit 10 can be in the form of hardware, or they can be in the form of software, that is, a form of a program executed by the microprocessor 4.

Figure 2:
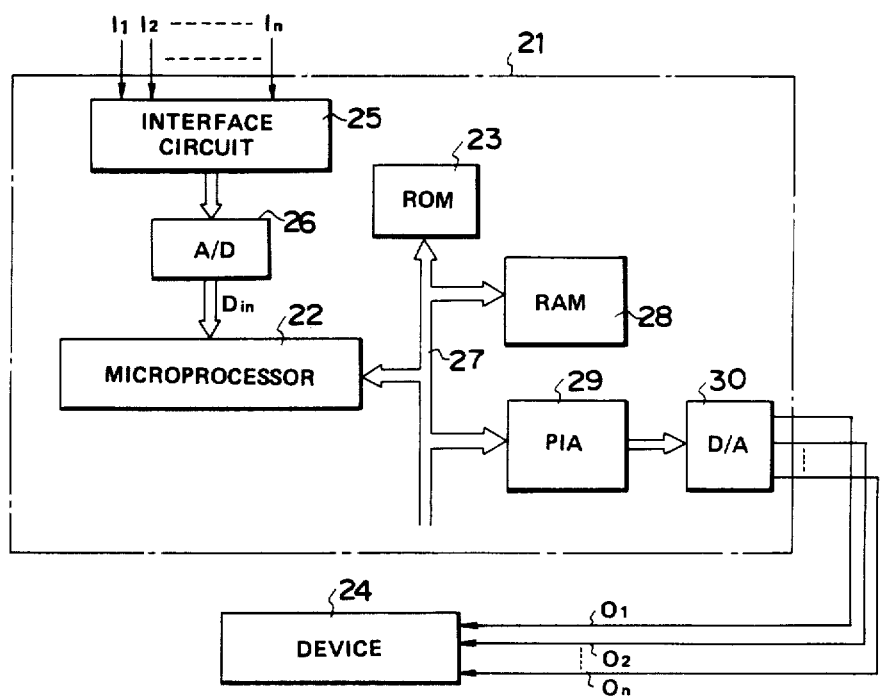
FIG. 2 is a block diagram of a more concrete embodiment of a data processing system according to the present invention.

FIG. 2 is a block diagram of a more concrete embodiment of a data processing system according to the present invention. A data processing unit 21 for controlling a device 24 has a microprocessor 22 and a read-only memory (ROM) 23. The program stored in the ROM 23 is executed by the microprocessor 22 in response to input signals $I_1$ through $I_n$. Then, the data processing unit 21 produces output signals $O_1$ through $O_n$ which are the results of the control calculations in the data processing unit 21. The device 24 is controlled by the control signals $O_1$ through $O_n$.

A detailed description will now be given of the construction of the data processing unit 21 with reference to FIG. 2. The input signals $I_1$ through $I_n$ are inputs to an interface circuit 25 wherein the levels of the input signals $I_1$ to $I_n$ are adjusted. After this, the interface circuit 25 outputs the signals to an analog-digital (A/D) converter 26 which converts them into digital form to obtain digital input data $D_{in}$. The microprocessor 22 is connected by a bus 27 to the ROM 23, a random access memory (RAM) 28 and a parallel interface adapter (PIA) 29, to thereby constitute a control unit which operates in a stored program system wherein a program stored in the ROM 23 is executed in response to the digital input data $D_{in}$. Then, the output from the PIA 29 is converted into analog form by a digital/analog (D/A) converter 30, to thereby obtain output signals $O_1$ through $O_n$ in analog form.

To make it possible to select an integrated circuit device for use as the microprocessor 22 from a group of at least two types of integrated circuit devices which are identical in basic construction and pin assignments but differ in register content and address assignment thereof, the basic construction and the pin assignments are exactly the same in the control apparatus 21. However, the control apparatus 21 has the function of discriminating the type of microprocessor 22 being used and also the function for changing a part of the execution of the control program stored in the ROM 23 in accordance with the result of the discrimination.

An explanation will now be given with reference to the flowchart shown in FIG. 3 for the construction of a program, for measuring the period of a rotating object, which has a discriminating function for discriminating the type of microprocessor being used in the data processing unit 21. The control apparatus 21 is adapted to assure compatibility between a 6801U4 microprocessor manufactured by Motorola Inc. (henceforward referred to as microprocessor A) and a 6801W2 microprocessor produced by The Fujitsu Company (henceforward referred to as microprocessor B). This control program discriminates the type of microprocessor being used by making use of the fact that the internal register address of the microprocessors A and B differs at address 1A as described below.

That is, these two microcomputers A and B are different in that while in microprocessor A an internal register address 1A is determined as the output comparing register 2 which is capable of writing/reading, the microprocessor B has no register assignment for its internal register address 1A so that data cannot be written thereto, data $FF usually being read out by addressing the address 1A (See table).

Therefore, after the start of this control program, the operation moves to step 41 wherein data $00 is first stored in the internal register address 1A of the microprocessor. Following this, the operation moves to step 42 in which the contents of this address 1A are read out after which the procedure moves to step 43 wherein the discrimination is made as to whether the content of the read-out data is $00. As can be understood from the above explanation, microprocessor 22 is discriminated as a microprocessor A if the result of the discrimination in step 43 is YES, and a microprocessor B when the result of the discrimination in step 43 is NO. The procedure moves to step 44 when the result of the discrimination in step 43 is YES, and microprocessor A is initialized. The operation then moves to step 45 wherein a flag F for showing the type of microprocessor being used is set to "1" in order to show that microprocessor A is being used. Meanwhile, the procedure moves to step 46 if the result of the discrimination in step 43 is NO, and the microprocessor B is initialized.

which kind of microprocessor is being used is made. Processing of data suitable for the particular microprocessor being used is carried out in accordance with the content of flag F showing the result of the discrimination. Consequently, the desired control calculation can be carried out normally without changing the control program regardless of which of the microprocessors A and B is being used.

In the above embodiment there is described a construction which maintains the compatibility of the two microprocessors A and B. However, according to the present invention, it is also possible to realize a construction wherein compatibility is maintained between more than three microprocessors. Furthermore, it is possible to similarly maintain compatibility with other types of elements within a predetermined range of selection in the case of elements other than a microprocessor, such as RAM, PIA, A/D and D/A.

Moreover, the basic means for discriminating the types of the individual elements is not limited to that of

TABLE

| | INTERNAL REGISTER ADDRESSES | |
|---|---|---|
| ADDRESS | MICROPROCESSOR A | MICROPROCESSOR B |
| 0 0 | PORT1 DATA DIRECTION REGISTER | ← |
| 1 9 | TIMER STATUS REGISTER | |
| 1 A | OUTPUT COMPARE REGISTER2(HIGH) | |
| 1 B | OUTPUT COMPARE REGISTER2(LOW) | OUTPUT COMPARE REGISTER2(HIGH) |
| 1 C | OUTPUT COMPARE REGISTER3(HIGH) | OUTPUT COMPARE REGISTER2(LOW) |
| 1 D | OUTPUT COMPARE REGISTER3(LOW) | INPUT CAPTURE REGISTER2(HIGH) |
| 1 E | INPUT CAPTURE REGISTER2(HIGH) | INPUT CAPTURE REGISTER2(LOW) |
| 1 F | INPUT CAPTURE REGISTER2(LOW) | |

After this, the operation proceeds to step 47 wherein the flag F is reset to "0" in order to show that the microprocessor B is being used. In this way, the type of microprocessor being used is discriminated and the initialization of the microprocessor 22 is performed in accordance with the result of the discrimination.

Figure 3:
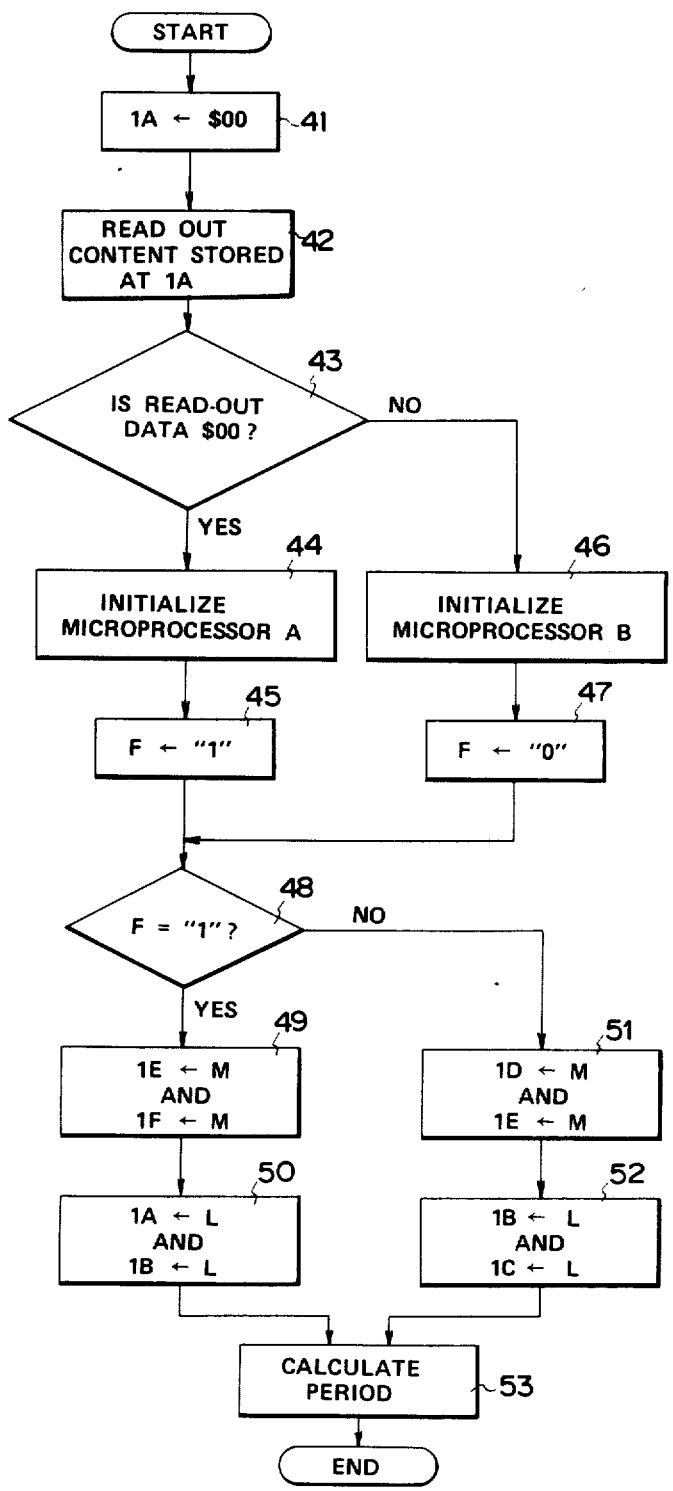
FIG. 3 is a flowchart showing a program executed in the microprocessor in FIG. 2.

The example illustrated in FIG. 3 shows a construction in which a rotational pulse signal, whose output timing changes in accordance to the speed of rotation of the body being detected, is input to the interface circuit 25 as an input signal to a rotation sensor (not shown); and the period of the rotation pulse signal is measured by the use of the input capture function and the timer function of the microprocessor 22.

First, the operation moves to step 48 where the content of flag F is discriminated. If the result is F="1", the operation proceeds to step 49 wherein data M showing the value of the timer at that instant is obtained on the basis of the input capture function in response to the rise of the rotation pulse signal. The data M is written to addresses 1E and 1F (refer to table). The procedure then moves to step 50 in which data L representing the value of the timer at the time when the rotation pulse signal falls is obtained on the basis of the output compare function, and the data L is written to addresses 1A and 1B. On the other hand, if F="0", the operation proceeds to step 51 wherein data M is written to address 1D and 1E and further to step 52 wherein data L is written to addresses 1B and 1C. The contents of these addresses are shown in the figures. After either one of steps 50 or 52 has been carried out, the procedure moves to step 53 in which the period of the rotation pulse signal is calculated on the basis of the difference between data M and L and the execution of the control program is terminated.

After this, data is written to the predetermined address, and then read out. From this, discrimination as to the embodiment and it goes without saying that the discrimination of the types of elements can be made using other means.

I claim:

1. A method of controlling a data processing system having at least one microprocessor for processing input data in accordance with a stored program, in which said microprocessor is selected from a predetermined plurality of microprocessors which have identical pin assignments and use identical machine language, but not identical address assignments of respective registers, said method comprising steps of:

storing in a memory means a discriminating program and a data processing program, said discriminating program to be executed normally by any selected microprocessor and being able to discriminate on the basis of the difference in the address assignments of the respective registers from among the predetermined plurality of microprocessors which type of microprocessor has been selected and used, said data processing program providing the correct execution of a prescribed data processing operation by the selected microprocessor when only information concerning the type of the microprocessor in use is provided;

executing said discriminating program during initialization of the system by the selected microprocessor to discriminate what type of microprocessor is used in the data processing system, said executing step including:

a. writing a prescribed data to a predetermined address of the register of the selected microprocessor;

b. reading out the data stored in the address to which the prescribed data is written by said writing step; and c. comparing the prescribed data with the data read out in said reading step, thereby discriminating the type of microprocessor the selected microprocessor is in accordance with the result of said comparing step;

producing discrimination data indicating the type of microprocessor which is currently in use in response to the result of the discrimination obtained by the execution of the discriminating program; and controlling the execution of said data processing program in response to the discrimination data so as to adapt the data processing program to the type of microprocessor in use at that time.

2. A method as claimed in claim 1 wherein said preparing step further comprises the steps of:

providing a plurality of data processing procedures corresponding to each of the to be selected integrated circuit devices in said data processing program; and selecting one procedure corresponding to the selected integrated circuit device in response to the discrimination data from the plurality of procedures.

3. A method as claimed in claim 2 wherein the providing step further comprises the step of storing data into a registor of the microprocessor for each of the procedures.

4. A method of controlling a stored program computer system having at least one microprocessor for processing input data, in which said microprocessor is selected from a predetermined plurality of microprocessors which have identical pin assignments and use identical machine language, but not identical address assignments of respective registers, said method comprising steps of:

storing a data to a predetermined address of a register of a selected microprocessor, said predetermined address being served to discriminate on the basis of the difference in the address assignments of the respective registers from among the predetermined plurality of microprocessors which type of microprocessor has been selected and used;

reading out a content of the predetermined address of said register;

discriminating on the basis of the content obtained by said reading out step which type of microprocessor is used in the system, said storing, reading out and discriminating steps being executed during initialization of said system;

producing discrimination data indicating the type of microprocessor which is currently in use in response to the result of said discriminating step; and controlling the execution of a data processing program in response to the discrimination data so as to adapt the data processing program to the type of microprocessor in use at that time, said data processing program providing the correct execution of a prescribed data processing operation by the selected microprocessor when only information concerning the type of the microprocessor in use in provided by the discrimination data.

* * * * *

UNITED STATES PATENT AND TRADEMARK OFFICE
CERTIFICATE OF CORRECTION

PATENT NO. : 4,853,844
DATED : August 1, 1989
INVENTOR(S) : Hiromo Kono

It is certified that error appears in the above-identified patent and that said Letters Patent is hereby corrected as shown below:

In column 7, lines 18-19, change "preparing" to --storing--.

In column 8, line 31, change the second occurrence of "in" to --is--.

Signed and Sealed this

Seventh Day of August, 1990

Attest:

HARRY F. MANBECK, JR.

Attesting Officer

Commissioner of Patents and Trademarks